United States Patent
Miyazaki et al.

(10) Patent No.: US 10,228,605 B2
(45) Date of Patent: Mar. 12, 2019

(54) WAVEGUIDE OPTICAL ELEMENT

(71) Applicant: Sumitomo Osaka Cement Co., Ltd, Tokyo (JP)

(72) Inventors: Norikazu Miyazaki, Tokyo (JP); Yoichi Hosokawa, Tokyo (JP); Toru Sugamata, Tokyo (JP)

(73) Assignee: SUMITOMO OSAKA CEMENT CO., LTD., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/893,849

(22) Filed: Feb. 12, 2018

(65) Prior Publication Data
US 2018/0284558 A1     Oct. 4, 2018

(30) Foreign Application Priority Data
Mar. 31, 2017 (JP) .................. 2017-069735

(51) Int. Cl.
| G02B 6/12 | (2006.01) |
| G02B 6/42 | (2006.01) |
| G02F 1/225 | (2006.01) |
| G02F 1/03 | (2006.01) |

(52) U.S. Cl.
CPC ....... *G02F 1/2257* (2013.01); *G02B 6/12004* (2013.01); *G02B 6/42* (2013.01); *G02F 1/0316* (2013.01); *G02B 2006/1204* (2013.01)

(58) Field of Classification Search
CPC ....... G02F 1/2257; G02F 1/0316; G02B 6/42; G02B 6/12004; G02B 2006/1204
See application file for complete search history.

(56) References Cited

FOREIGN PATENT DOCUMENTS

| JP | 2004-191539 A | 7/2004 |
| JP | 2007-272122 A | 10/2007 |
| JP | 2009-145816 A | 7/2009 |
| JP | 5271369 B2 | 8/2013 |

*Primary Examiner* — Ryan Lepisto
*Assistant Examiner* — Erin Chiem
(74) *Attorney, Agent, or Firm* — Taft Stettinus & Hollister LLP (57) ABSTRACT

A waveguide optical element which includes a plurality of optical waveguides provided on a substrate having an electro-optic effect includes: a plurality of signal electrodes controlling light waves propagating through the optical waveguides; and a plurality of ground electrodes provided so as to interpose each of the signal electrodes therebetween, in which at least one of the ground electrodes includes a first layer and a second layer formed on the first layer, the second layer is formed such that a distance between the second layer and the signal electrode adjacent to the second layer is larger than a distance between the first layer and said signal electrode adjacent to said second layer, and a thickness of the ground electrode which includes the first layer and the second layer is 25 μm or more.

7 Claims, 5 Drawing Sheets

WAVEGUIDE OPTICAL ELEMENT

CROSS-REFERENCE TO RELATED APPLICATIONS

This application claims the benefit of Japanese Patent Application No. 2017-069735 filed Mar. 31, 2017, the disclosure of which is herein incorporated by reference in its entirety.

BACKGROUND OF THE INVENTION

Field of the Invention

The present invention relates to a waveguide optical element which is configured of an optical waveguide formed on a substrate and in particular, to a waveguide optical element which performs an operation such as optical modulation by applying an electric field to optical waveguides provided in parallel on a substrate.

Description of Related Art

In recent years, in the optical communication field or the optical measurement field, a waveguide optical element such as an optical modulator in which an optical waveguide is formed on a substrate having an electro-optic effect has been frequently used. The waveguide optical element is generally provided with a control electrode for controlling light waves propagating through the optical waveguide together with the optical waveguide.

As such a waveguide optical element, a Mach-Zehnder optical modulator using, for example, lithium niobate ($LiNbO_3$) (also referred to as "LN") which is ferroelectric crystal for a substrate has been widely used. The Mach-Zehnder optical modulator is provided with a Mach-Zehnder optical waveguide which is configured of an input waveguide for introducing light from the outside, a branching section for propagating light introduced by the input waveguide with the light divided into two paths, two parallel waveguides which propagate the respective branched light beams to a rear stage of the branching section, and an output waveguide for combining the light beams propagating through the two parallel waveguides and outputting the combined light to the outside.

Further, the Mach-Zehnder optical modulator is provided with a control electrode for performing control by shifting the phases of light waves propagating through the parallel waveguides by utilizing the electro-optic effect by applying a voltage. The control electrode is generally configured of a radio frequency (RF) signal electrode (hereinafter referred to as a "signal electrode") formed above or in the vicinity of the parallel waveguides, and a ground electrode disposed to be spaced apart from the signal electrode.

In recent years, in order to meet the needs of large-capacity and high-frequency optical transmission, a multi-level modulation form using phase modulation has been studied and partially commercialized. For example, in an optical modulation form which is called quadrature phase shift keying (QPSK) or quadrature amplitude modulation (16 QAM), a nested optical modulator has been used. The nested optical modulator performs an optical modulation operation by respectively forming other Mach-Zehnder optical waveguides at portions corresponding to two parallel waveguides of the Mach-Zehnder optical waveguide, and shifting the phases of the light waves propagating through the parallel waveguides with respect to a total of four parallel waveguides configuring the other two Mach-Zehnder optical waveguides.

On the other hand, a market demand for an increase in optical transmission capacity is increasing year by year, and along with a constant demand for downsizing and wider bandwidth of an optical transmission apparatus, a demand for downsizing and wider bandwidth of such a nested optical modulator is increasing more and more. In particular, with respect to a modulation bandwidth, for example, at a transmission rate of 100 Gbps, a symbol rate up to 32 Gbaud is used so far, and in a transmission system exceeding 400 Gbps, application of a symbol rate up to 64 Gbaud exceeding it is considered.

However, in the nested optical modulator described above, a plurality of signal electrodes provided in the four parallel waveguides are in proximity to each other, and therefore, if a modulation frequency has a wider bandwidth, characteristic deterioration due to electric crosstalk between the signal electrodes cannot be ignored.

In particular, in an optical modulator of the related art, it is common to lower a conductor loss of a signal electrode by increasing the height of the signal electrode in order to secure a high-frequency characteristic in a desired bandwidth. For this reason, the height of the signal electrode becomes much higher than the height of a peripheral ground electrode (GND electrode), and thus the shielding effect of the ground electrode provided between the signal electrodes adjacent to each other with respect to the signal electrodes adjacent to each other is limited. As a result, the crosstalk between the signal electrodes adjacent to each other can become more remarkable as the height of the signal electrode becomes higher.

In order to suppress such electric crosstalk, it is effective to widen the interval between the signal electrodes. However, for that purpose, it is necessary to widen the interval between the parallel waveguides configuring the nested optical modulator, so that the size in a width direction (a direction orthogonal to a light propagation direction) of the nested optical modulator is increased. Further, from the viewpoint of keeping the loss of light propagating through the optical waveguide low, there is a limit to a reduction in the curvature of the optical waveguide, and if the interval between the parallel waveguides is widened, the distances between the parallel waveguides and the input waveguide and the output waveguide also increase, and therefore, the size in a length direction (a direction parallel to the light propagation direction) of the nested optical modulator is also increased.

As another technique for reducing the electric crosstalk without widening the interval between the signal electrodes, it is conceivable to reduce a line of electric force which is radiated from the signal electrode to a space by reducing the size in a width direction of a signal line which is configured of the signal electrode and the ground electrode by narrowing the width of the signal electrode, narrowing the interval between the signal electrode and the ground electrode, or the like.

However, in this case, in addition to an increase in the electric loss of the signal electrode, a change in high-frequency characteristic, such as impedance mismatch between a drive circuit which operates the nested optical modulator and the signal line, or mismatch (propagation speed mismatch) between the propagation speed of light in the optical waveguide and the propagation speed of an electric signal propagating through the signal line, is caused, so that the technique is not a good idea.

As still another technique for suppressing the electric crosstalk, it is known that the height of a ground electrode interposed between signal electrodes is made higher than the height of the signal electrode or a conductor wire or a conductor ribbon is raised in an arc shape on the ground electrode (refer to Japanese Patent No. 5271369). However, in order to form the ground electrode to be higher than the signal electrode, an additional electrode metal forming process is required, and in order to raise the conductor wire, an excess bonding process is required, and thus from the viewpoint of the complication of the manufacturing process, both the processes are not good ideas. Further, if excess bonding is performed, extra damage or stress to a substrate occurs, and thus also from the viewpoint of a decrease in yield and reliability, it can become problematic. Such a problem is remarkable especially in a case where the substrate is thinned.

SUMMARY OF THE INVENTION

From the above background, in a waveguide optical element in which a plurality of signal electrodes for modulating a plurality of optical waveguides are formed in parallel on a substrate, it is desired to reduce the electric crosstalk between the signal electrodes without causing the complication of a manufacturing process and without causing a change in the high-frequency characteristic of a signal line which is configured of a signal electrode and a ground electrode.

An aspect of the present invention relates to a waveguide optical element which includes a plurality of optical waveguides provided in parallel on a substrate having an electro-optic effect. The waveguide optical element includes a plurality of signal electrodes provided in parallel and controlling light waves propagating through each of the optical waveguides, and a plurality of ground electrodes provided so as to interpose each of the signal electrodes therebetween in a surface direction of the substrate. Here, at least one of the ground electrodes includes a first layer and a second layer formed on the first layer, the second layer is formed such that a distance between the second layer and the signal electrode adjacent to the second layer is larger than a distance between the first layer and said signal electrode adjacent to said second layer, and a thickness of the ground electrode which includes the first layer and the second layer is 25 µm or more.

According to another aspect of the present invention, a thickness of the signal electrode is the same as a thickness of the second layer of the ground electrode.

According to another aspect of the present invention, the signal electrode includes a third layer formed on the substrate, and a fourth layer formed on the third layer, and the second layer is formed such that a distance between the second layer and the fourth layer of the signal electrode adjacent to the second layer is larger than a distance between the first layer and the third layer of said signal electrode adjacent to said second layer.

According to another aspect of the present invention, thicknesses of the third layer and the fourth layer are the same as thicknesses of the first layer and the second layer, respectively.

According to another aspect of the present invention, the first layer and the second layer include materials different from each other.

According to another aspect of the present invention, the first layer and the third layer include the same material, and the second layer and the fourth layer include the same material.

According to another aspect of the present invention, the substrate includes $LiNbO_3$ and has a thickness of less than 30 µm.

DETAILED DESCRIPTION OF THE INVENTION

Figure 1:
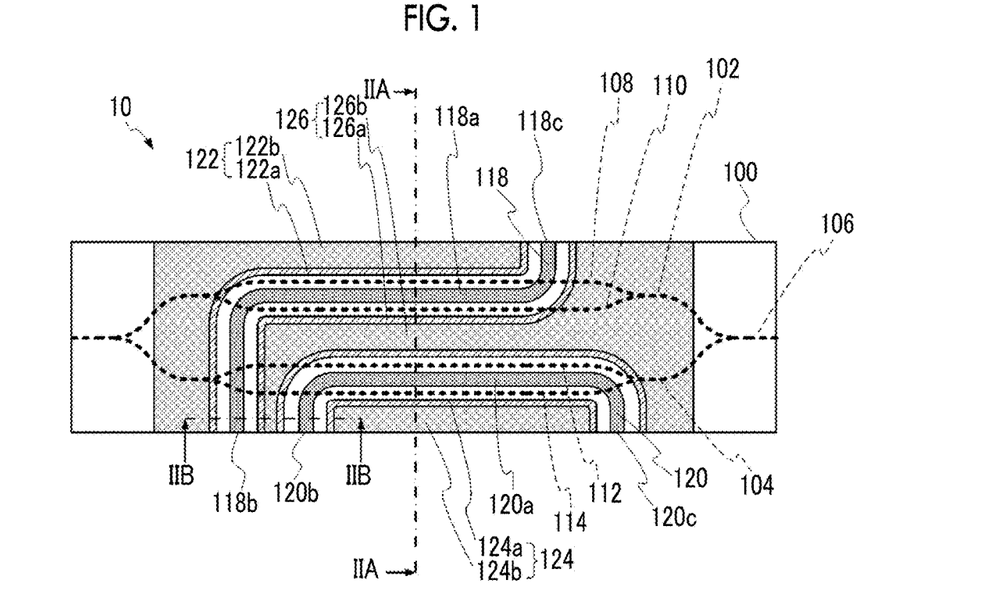
FIG. 1 is a plan view showing a configuration of a waveguide optical element according to an embodiment of the present invention.
Figure 2A:
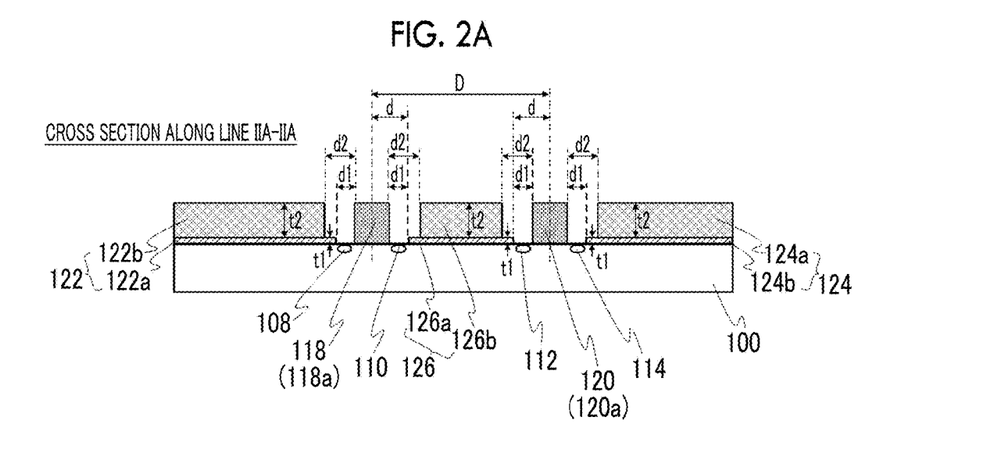
FIG. 2A is a sectional view taken along line IIA-IIA of the waveguide optical element shown in FIG. 1.
Figure 2B:
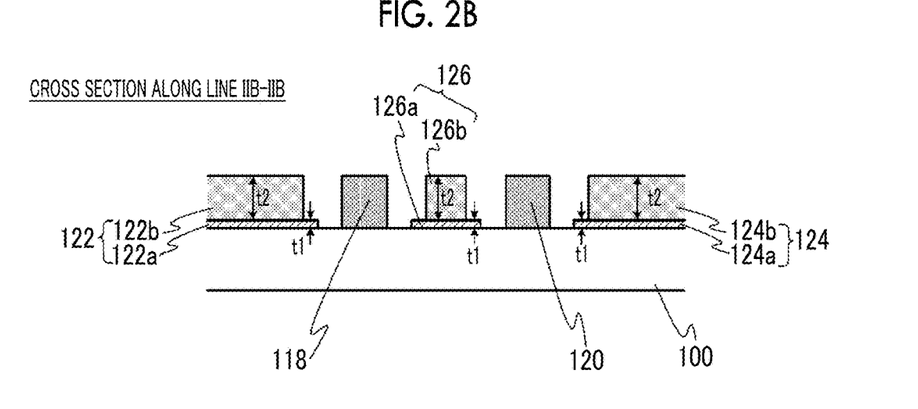
FIG. 2B is a sectional view taken along line IIB-IIB of the waveguide optical element shown in FIG. 1.

Hereinafter, an embodiment of the present invention will be described with reference to the drawings. FIG. 1 is a diagram showing the configuration of a waveguide optical element according to an embodiment of the present invention. Further, FIG. 2A and FIG. 2B are respectively sectional views of the waveguide optical element taken along line IIA-IIA and line IIB-IIB in FIG. 1 and viewed in a direction of an arrow.

A waveguide optical element 10 according to this embodiment is, for example, a QPSK optical modulator (a bias electrode of each sub-MZ portion and an electrode for 90° phase shift are not shown) and is configured with a nested MZ waveguide 106 which is configured of two MZ waveguides 102 and 104 formed on a substrate 100 having an electro-optic effect, which is, for example, an X-cut LN substrate. The MZ waveguides 102 and 104 are respectively provided with optical waveguides 108 and 110 and optical waveguides 112 and 114, which are parallel waveguides.

Radio-frequency (RF) electrodes 118 and 120 which are control electrodes made of highly conductive metal such as gold (Au), silver (Ag), copper (Cu), an alloy thereof, or the like are formed on the LN substrate 100, and GND electrodes (ground electrodes) 122, 124, and 126 are formed so as to interpose each of the signal electrodes 118 and 120 therebetween along a substrate surface direction. In this way, the signal electrode 118 is interposed between the GND electrodes 122 and 124, thereby configuring one coplanar waveguide (CPW) electrode which is a signal line, and the signal electrode 120 is interposed between the GND electrodes 124 and 126, thereby configuring another CPW electrode which is a signal line.

Here, the nested MZ waveguide 106 can be manufactured by various known methods such as a method of thermally diffusing metal titanium (Ti) on the substrate 100, for example. Further, the substrate 100 is, for example, an X-cut LN substrate, and therefore, in order to obtain the maximum refractive index change with respect to an applied electric field, the signal electrodes 118 and 120 are respectively disposed between the optical waveguides 108 and 110 and between the optical waveguides 112 and 114 such that an electric field is applied parallel to the substrate surface of the substrate 100 in the optical waveguides 108 to 114, and the GND electrodes 122, 124, and 126 are disposed such that the optical waveguides 108 and 110 are disposed between the signal electrode 118 and the GND electrodes 122 and 124 and the optical waveguides 112 and 114 are disposed between the signal electrode 120 and the GND electrodes 124 and 126.

The signal electrode 118 has an action portion 118a (a hatched portion) formed substantially in parallel along the optical waveguides 108 and 110, and similarly, the signal electrode 120 has an action portion 120a (a hatched portion) formed substantially in parallel along the optical waveguides 112 and 114.

Further, a right end portion in the drawing of the action portion 118a of the signal electrode 118 extends to an end portion of the substrate 100, and the end portion configures a signal output end 118c. The signal output end 118c is connected to a termination resistor (not shown) provided outside the substrate 100, so that a high-frequency signal input from a signal input end 118b of the signal electrode 118 passes through the action portion 118a and reaches from the signal output end 118c to the termination resistor, thereby being non-reflectively terminated.

Similarly, a right end portion in the drawing of the action portion 120a of the signal electrode 120 extends to an end portion of the substrate 100, and the end portion configures a signal output end 120c. The signal output end 120c is connected to a termination resistor (not shown) provided outside the substrate 100, so that a high-frequency signal input from a signal input end 120b of the signal electrode 120 passes through the action portion 120a and reaches from the signal output end 120c to the termination resistor, thereby being non-reflectively terminated.

In the following, in order to simplify description and facilitate understanding, the expressions "signal electrode 118" and "signal electrode 120" shall respectively mean the action portions 118a and 120a of the signal electrodes 118 and 120 unless otherwise specified.

In the waveguide optical element 10 of this embodiment shown in FIG. 1, FIG. 2A, and FIG. 2B, in particular, the GND electrodes 122, 124, and 126 are respectively configured of lower layers 122a, 124a, and 126a each having a thickness t1 and upper layers 122b, 124b, and 126b each having a thickness t2 larger than the thickness t1 and respectively formed on the lower layers 122a, 124a, and 126a. Further, a configuration is made such that in each of the GND electrodes 122, 124, and 126, a distance (d2) from each of the signal electrode 118 and 120 adjacent thereto to each of the upper layer 122b, 124b, and 126b is larger than a distance (d1) from each of the signal electrode 118 and 120 adjacent thereto to each of the lower layer 122a, 124a, and 126a (d2>d1).

Further, in particular, in the waveguide optical element 10 of this embodiment, the thickness (height) of each of the signal electrodes 118 and 120 and the GND electrodes 122, 124, and 126 is set to be several tens of µm (for example, 30 µm) which is several times more larger than the value of about 10 µm which is usually used in the related art, as will be described later. For this reason, the area of each of the signal electrodes 118 and 120 facing each of the GND electrodes 122, 124, and 126 is several times larger than that of the configuration in the related art, and thus almost all of the lines of electric force emitted from each of the signal electrodes 118 and 120 are confined between each of the signal electrodes 118 and 120 and each of the GND electrodes 122, 124 and 126. As a result, the electric crosstalk between the signal electrodes 118 and 120 is effectively reduced.

In general, in a case where the thickness of each of a signal electrode and a GND electrode is simply increased, the capacitance between the facing surfaces of the signal electrode and the GND electrode increases. As a result, as described above in the description of the related art, in a signal line which is configured of a signal electrode and a GND electrode, high-frequency impedance changes and the propagation speed of a high-frequency signal propagating through the signal line also changes, so that an operating characteristic (for example, a modulation characteristic) as a waveguide optical element deteriorates. Further, in a case where in order to compensate for this, the capacitance is lowered to the original value by simply increasing the distance between the signal electrode and the GND electrode, an electric field which is applied to an optical waveguide formed on the substrate surface between the signal electrode and the GND electrode is lowered, so that an operating characteristic as a waveguide optical element also deteriorates.

In contrast, in the waveguide optical element 10 of this embodiment, in each of the GND electrodes 122, 124, and 126, the distance (d2) from each of the signal electrode 118 and 120 adjacent thereto to each of the upper layer 122b, 124b, and 126b and the distance (d1) from each of the signal electrode 118 and 120 adjacent thereto to each of the lower layer 122a, 124a, and 126a are set to be different from each other, and d1 and d2 can be individually set. Further, the electric field which is applied to the optical waveguide 108 or the like is determined by the distance d1 between the lower layer 112a or the like and the signal electrode 118 or the like, and therefore, by adjusting the distance d1, It is possible to apply a desired electric field to the optical waveguide 108 or the like with respect to a voltage which is applied to the signal electrodes 118 and 120.

Further, in the waveguide optical element 10 of this embodiment, in the GND electrodes 122, 124, and 126, the thickness t2 of each of the upper layers 122b, 124b, and 126b is larger than the thickness t1 of each of the lower layers 122a, 124a, and 126a, and therefore, the capacitance between the facing surfaces of each of the signal electrodes 118 and 120 and each of the GND electrodes 122, 124 and 126 is determined by the distance d2 between each of the signal electrodes 118 and 120 and each of the upper layers 122b, 124b, and 126b of the GND electrodes 122, 124, and 126. Therefore, by adjusting the distance d2, it is possible to prevent deterioration of modulation characteristic by compensating for a change in the high-frequency impedance and the high-frequency propagation speed of the signal line.

That is, in the waveguide optical element 10 of this embodiment, it is possible to prevent deterioration of the operating characteristic of the waveguide optical element 10 by compensating for a change in the high-frequency characteristic of the signal line due to thickening the signal electrodes 118 and 120 and the GND electrodes 122, 124, and 126, while securing an applied electric field necessary for the optical waveguide 108 or the like without causing an increase in an applied voltage which is required for the signal electrodes 118 and 120.

Further, for example, if the lower layers 122a, 124a, and 126a and the upper layers 122b, 124b, and 126b are made of the same metal material as the signal electrodes 118 and 120, the formation of the signal electrodes 118 and 120 on the substrate 100 can be performed at the same time as the formation of the lower layers 122a, 124a and 126a and the upper layers 122b, 124b and 126b, and therefore, an extra (additional) metal film formation process does not occur.

Further, it is favorable if the lower layer 122a or the like is a thin layer (for example, 1 µm or more) to the extent that an applied electric field to the optical waveguide 108 or the like is secured, and by setting the thickness of the lower layer 122a or the like to be in a range of about 1 to 10 µm, it is possible to suppress an increase in electric loss due to electric field concentration on an electrode lower layer portion. Further, if an electrode thickness is in a range of about 1 to 10 µm, it is possible to accurately perform patterning on the substrate 100 by using a plating process. Further, the upper layer 122b or the like is also formed at a position far from the signal electrode, compared to the configuration of the related art, and therefore, it is easy to form an electrode, compared to a configuration in which the electrode is formed proximate to the signal electrode without using a lower layer, as in the related art. For this reason, compared to the related art in which a GND electrode is configured in a simple columnar shape without using a lower layer, it is possible to suppress variation in manufacturing and improve a yield.

In this embodiment, as shown in FIG. 1 and FIG. 2B, the GND electrodes 122, 124, and 126 interposing each of the signal electrodes 118 and 120 therebetween over the entirety of the signal electrodes 118 and 120 from the signal input ends 118b and 120b to the signal output ends 118c and 120c of the signal electrodes 118 and 120 are configured such that the distance (d2) from each of the signal electrodes 118 and 120 adjacent thereto to each of the upper layers 122b, 124b, and 126b is larger than the distance (d1) from each of the signal electrodes 118 and 120 adjacent thereto to each of the lower layers 122a, 124a, and 126a (d2>d1).

However, it is favorable if the matching of the propagation speed of the light wave and the propagation speed of the high-frequency signal is realized in at least the action portions 118a and 120a of the signal electrodes 118 and 120. Therefore, as shown in a first modification example which will be described later, with respect to the portions of the GND electrodes 122, 124, and 126, which interpose each of the portions other than the action portions 118a and 120a of the signal electrodes 118 and 120 therebetween, it is not necessary to necessarily satisfy the relationship of d2>d1, and, for example, the relationship of d2=d1 (that is, for example, the lower layer 122a does not extend from an edge of the upper layer 122b toward the signal electrode 118) may be satisfied.

Further, in this embodiment, it is assumed that all of the GND electrodes 122, 124, and 126 are configured of an upper layer and a lower layer. However, If at least one GND electrode (for example, the GND electrode 126 interposed between the signal electrodes 118 and 120) is configured of an upper layer and a lower layer and the above-described conditions relating to t1, t2, d1, and d2 are satisfied, a certain electric crosstalk reducing effect can be obtained.

Figure 3A:
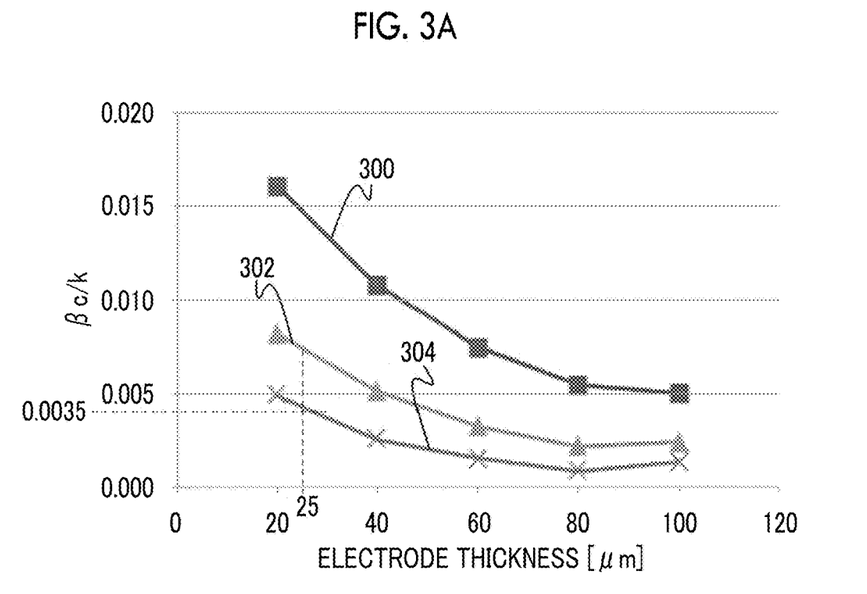
FIG. 3A is an explanatory view for explaining the relationship between the thickness of an upper layer of a GND electrode and crosstalk between signal electrodes, in the waveguide optical element shown in FIG. 1.
Figure 3B:
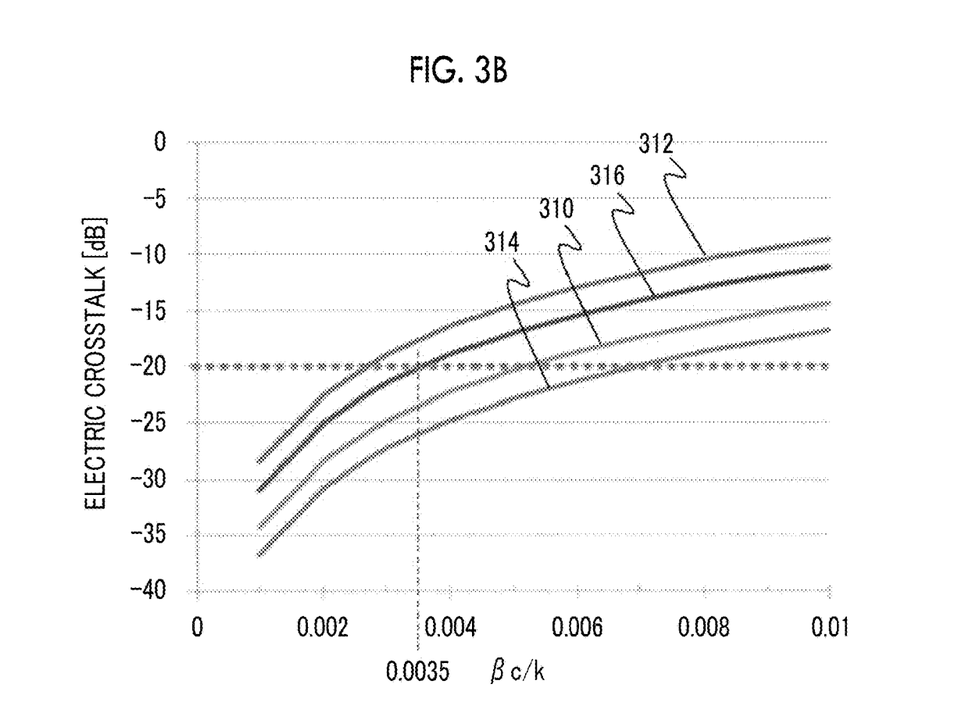
FIG. 3B is an explanatory view for explaining the relationship between the thickness of the upper layer of the GND electrode and the crosstalk between signal electrodes, in the waveguide optical element shown in FIG. 1.

Next, the relationship between the electrode thickness (t1+t2) and the electric crosstalk amount between the signal electrodes 118 and 120 in the configuration of the waveguide optical element 10 of this embodiment will be described using FIG. 3A and FIG. 3B. FIG. 3A is a diagram showing the relationship between the electrode thickness (t1+t2) and a coupling coefficient $\beta_c/k$ between the signal electrodes 118 and 120, and FIG. 3B is a diagram showing the relationship between the coupling coefficient $\beta_c/k$ and the electric crosstalk amount between the signal electrodes 118 and 120. In FIG. 3A, the horizontal axis represents the electrode thickness (t1+t2), and the vertical axis represents the coupling coefficient $\beta_c/k$. Further, in FIG. 3B, the horizontal axis represents the coupling coefficient $\beta_c/k$, and the vertical axis represents the electric crosstalk amount between the signal electrodes 118 and 120. In FIG. 3B, the electric crosstalk amount is the ratio of the high-frequency signal power coupled to the signal line on the other side to the high-frequency signal power input to the signal line on one side, out of two signal lines which are configured by the signal electrodes 118 and 120, and the unit thereof is dB.

Here, $\beta_c$ is a propagation constant of the high-frequency signal in a state where the signal electrodes 118 and 120 are coupled, and k is a wave number. The configurations of the signal lines which are configured by the signal electrodes 118 and 120 are substantially the same, and therefore, the electric crosstalk amount P between the signal electrodes 118 and 120 is approximately calculated by an expression, $P=\sin^2(\beta_c \cdot k \cdot L)$.

In FIG. 3A, the value of the coupling coefficient $\beta_c/k$ is shown using the ratio (D/d) of a distance D (refer to FIG. 2A) from the center of the signal electrode 118 to the center of the signal electrode 120 to a distance d from the center of the signal electrode 118 to the lower layer 126a (and 122a) of the GND electrode 126 (and 122) adjacent thereto as a parameter. More specifically, curves 300, 302, and 304 in FIG. 3A show the values of the coupling coefficient $\beta_c/k$ with respect to the electrode thickness (t1+t2) at D/d having the values of 6, 8, and 10, respectively. In the graph shown in FIG. 3A, it is assumed that the distance d from the center of the signal electrode 120 to the lower layer 126a (and 124a) of the GND electrode 126 (and 124) adjacent thereto has the same value as the distance d from the center of the signal electrode 118 to the lower layer 126a (and 122a) of the GND electrode 126 (and 122) adjacent thereto.

Further, in FIG. 3B, curves 310 and 312 respectively show the electric crosstalk amount between the signal electrodes 118 and 120 when a signal frequency is 23 GHz and 45 GHz in a case where the signal line length of a parallel section is 40 mm. 23 GHz and 45 GHz respectively are frequency bands (about 70% of a symbol rate) which are required for the symbol rates of 32 GBaud and 64 GBaud. Further, curves 314 and 316 respectively show the electric crosstalk amount between the signal electrodes 118 and 120 when a signal frequency is 23 GHz and 45 GHz in a case where the signal line length of a parallel section is 30 mm. Here, the signal line lengths of 30 mm and 40 mm are signal line lengths in a waveguide optical element having a general size which is permitted in the market.

In general, if the electric crosstalk amount is about −20 dB (about 1/100 of the input high-frequency signal power), it can be considered that the effect of the electrical crosstalk is substantially sufficiently suppressed. The shorter length of the parallel section of the signal line is preferable, and therefore, if the upper limit of a design typical value of the signal line length is set to be 30 mm, at the operating frequency of 45 GHz, 0.0035 or less is preferable as the coupling coefficient $\beta_c/k$ (FIG. 3B), and therefore, the electrode thickness (t1+t2) is preferably 25 μm or more.

Next, modification examples of the waveguide optical element 10 shown in FIG. 1, FIG. 2A, and FIG. 2B will be described.

First Modification Example

Figure 4:
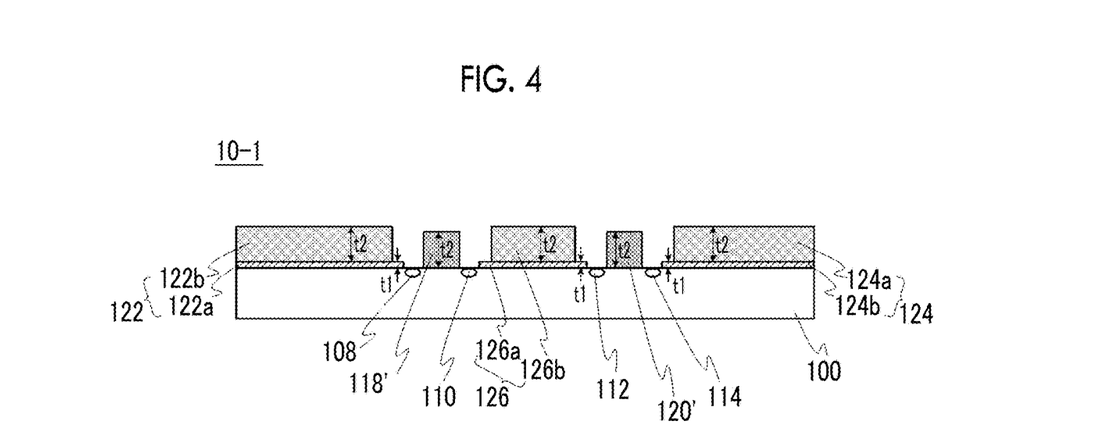
FIG. 4 is a diagram showing a first modification example of the waveguide optical element shown in FIG. 1.

First, a waveguide optical element 10-1 according to a first modification example of the waveguide optical element 10 will be described. The waveguide optical element 10-1 has the same configuration as the waveguide optical element 10. However, the waveguide optical element 10-1 is provided with signal electrodes 118' and 120' instead of the signal electrodes 118 and 120. Further, the signal electrodes 118' and 120' have the same configurations as the signal electrodes 118 and 120. However, the height of each of the signal electrodes 118' and 120' is different from the height of each of the signal electrodes 118 and 120.

FIG. 4 is a sectional view of the waveguide optical element 10-1, corresponding to the sectional view taken along line IIA-IIA (FIG. 2A) of the waveguide optical element 10. In the waveguide optical element 10 shown in FIG. 1, FIG. 2A, and FIG. 2B, the height of each of the signal electrodes 118 and 120 is the same as the height of each of the GND electrodes 122, 124, and 126, whereas in this modification example, the height (thickness) of each of the signal electrodes 118' and 120' is set to be the same as the height (thickness) t2 of each of the upper layers 122*b*, 124*b*, and 126*b* of the GND electrodes 122, 124, and 126.

That is, in this configuration, a configuration is made such that the height of each of the signal electrodes 118' and 120' is lower than each of the GND electrodes 122, 124, and 126 by the height t1 of the lower layer 122*a* or the like. For this reason, in this configuration, the crosstalk between the signal electrodes 118' and 120' can be further reduced compared to the waveguide optical element 10. Further, in this configuration, if the signal electrodes 118' and 120' are made of the same material as the upper layers 122*b*, 124*b*, and 126*b*, this is convenient because the signal electrodes 118' and 120' and the upper layers 122*b*, 124*b*, and 126*b* can be formed at the same time in a single film formation process.

Second Modification Example

Figure 5:
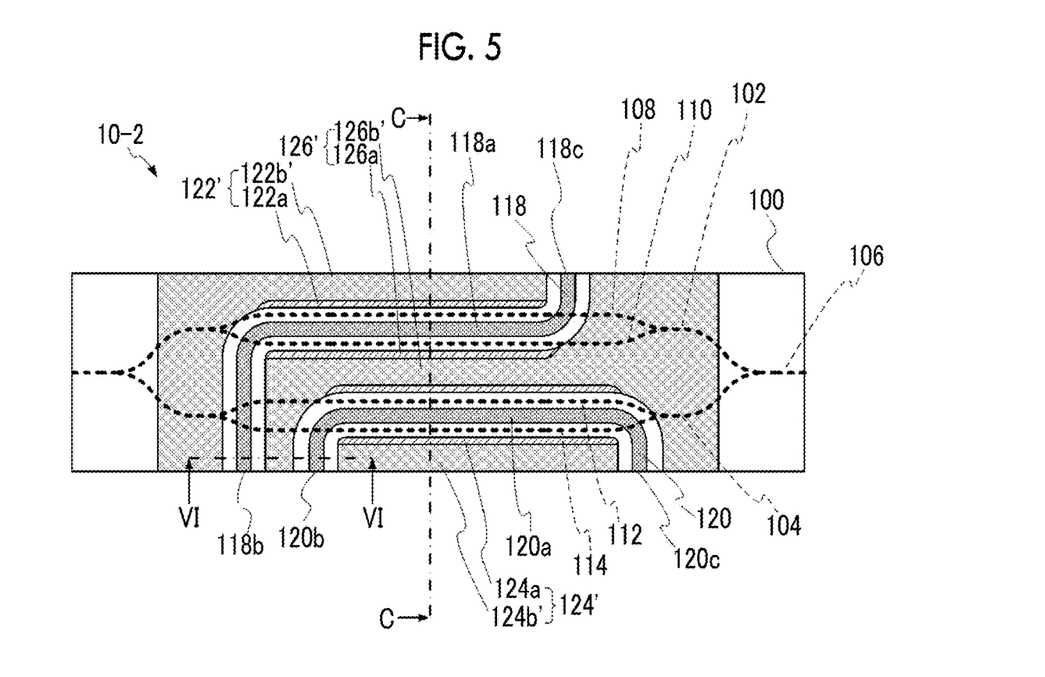
FIG. 5 is a diagram showing a second modification example of the waveguide optical element shown in FIG. 1.
Figure 6:
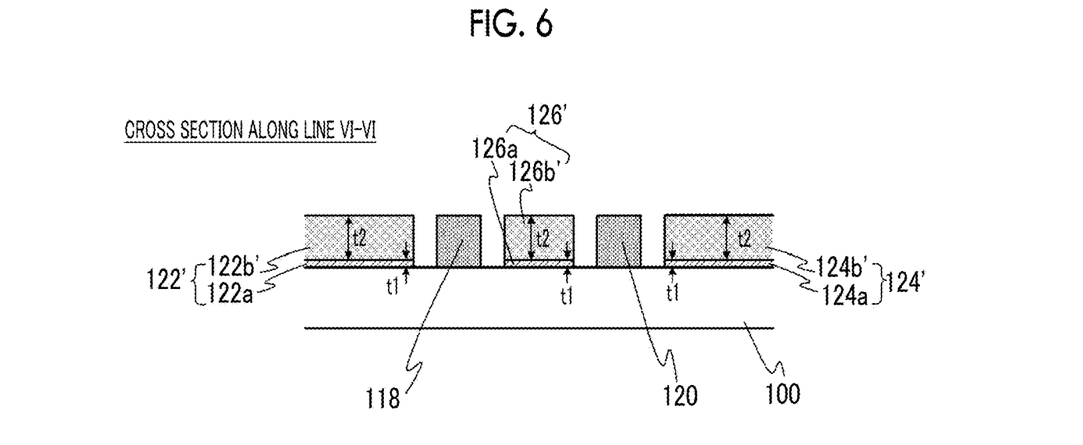
FIG. 6 is a sectional view taken along line VI-VI in the second modification example shown in FIG. 5.

Next, a second modification example of the waveguide optical element 10 will be described. FIG. 5 is a diagram showing the configuration of a waveguide optical element 10-2 which is the second modification example of the waveguide optical element 10, and FIG. 6 is a sectional view of the waveguide optical element 10-2 taken along line VI-VI in FIG. 5 and viewed in a direction of an arrow. In FIG. 5 and FIG. 6, constituent elements corresponding to the constituent elements shown in FIG. 1 and FIG. 2B and having different shapes from the constituent elements shown in FIG. 1 and FIG. 2B are denoted by reference numerals with a dash (') appended to each of the reference numerals of the constituent elements shown in FIG. 1 and FIG. 2B.

As described above, it is favorable if the matching of the propagation speed of the light wave and the propagation speed of the high-frequency signal is realized in at least the action portions 118*a* and 120*a* of the signal electrodes 118 and 120. Therefore, the waveguide optical element 10-2 according to this modification example is configured such that with respect to the portions of GND electrodes 122', 124', and 126' which interpose each of the action portions 118*a* and 120*a* of the signal electrodes 118 and 120 therebetween, the relationship of d2>d1 is satisfied (that is, the C-C cross section in FIG. 5 is the same as the IIA-IIA cross section in FIG. 2A), and on the other hand, with respect to the portions of the GND electrodes 122', 124', and 126', which interpose each of portions other than the action portions 118*a* and 120*a* therebetween, a configuration is made such that an edge of the upper layer and an edge of the lower layer are at the same position.

That is, in the cross section taken along line VI-VI of the waveguide optical element 10-2 shown in FIG. 5, unlike the cross section taken along line IIB-IIB (FIG. 2B) of the waveguide optical element 10, a configuration is made such that in the vicinity of the signal input ends 118*b* and 120*b*, an edge of each of upper layers 122*b'*, 124*b'*, and 126*b'* is at the same position as an edge of each of the lower layers 122*a*, 124*a*, and 126*a*, as shown in FIG. 6. In FIG. 6, as an example, the cross section taken along line VI-VI of the portions of the signal input ends 118*b* and 120*b* of the signal electrodes 118 and 120 is shown. However, in this modification example, not only in the portions of the signal input ends 118*b* and 120*b* but also in the structures of the portions other than the action portions 118*a* and 120*a*, such as the vicinity of the signal output end 118*c* or the vicinity of the signal output end 120*c*, a configuration is made such that an edge of each of the upper layers 122*b'*, 124*b'*, and 126*b'* is at the same position as an edge of each of the lower layers 122*a*, 124*a*, and 126*a*, similar to FIG. 6.

Also in such a configuration, in the action portions 118*a* and 120*a* of the signal electrodes 118 and 120, it is possible to reduce the crosstalk between the signal electrodes 118 and 120 while attaining the matching of the propagation speed of the high-frequency signal propagating through the action portions 118*a* and 120*a* and the propagation speed of the light waves propagating through the parallel waveguides 108, 110, 112, and 114.

With respect to the portions of the GND electrodes 122', 124', and 126', which interpose each of portions other than the action portions 118*a* and 120*a* therebetween, each of the portions does not necessarily need to be divided into an upper layer and a lower layer, and for example, a configuration in which there is no lower layer is also acceptable.

Third Modification Example

Figure 7:
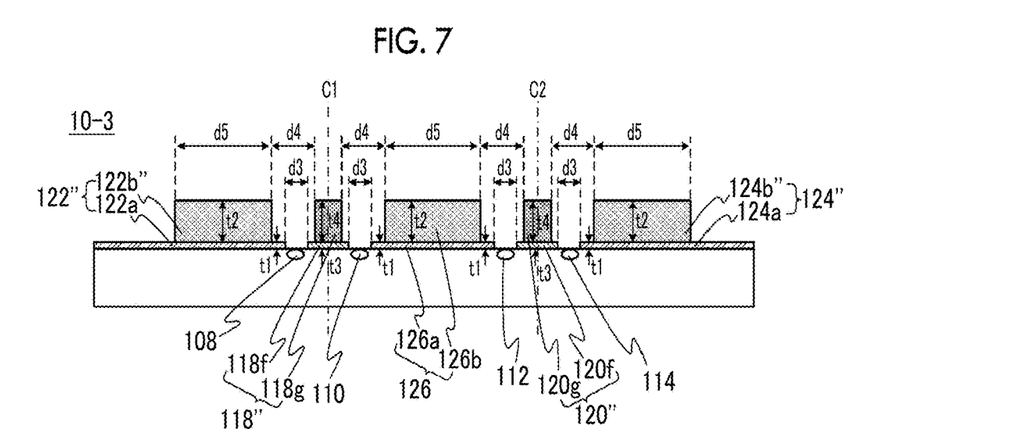
FIG. 7 is a sectional view showing a third modification example of the waveguide optical element shown in FIG. 1.

Next, a waveguide optical element 10-3 according to a third modification example of the waveguide optical element 10 will be described. FIG. 7 is a sectional view in portions corresponding to the action portions 118*a* and 120*a*, of the waveguide optical element 10-3, corresponding to the sectional view taken along line IIA-IIA (FIG. 2A) of the waveguide optical element 10. This modification example has the same configuration as the waveguide optical element 10. However, this modification example is different from the waveguide optical element 10 in that this modification example has signal electrodes 118" and 120" instead of the signal electrodes 118 and 120 and has GND electrodes 122" and 124" instead of the GND electrodes 122 and 124.

The signal electrodes 118" and 120" have the same configurations as the signal electrodes 118 and 120. However, the signal electrodes 118" and 120" are different from the signal electrodes 118 and 120 in that the signal electrodes 118" and 120" are respectively configured of lower layer 118*f* and 120*f* each having a thickness t3 and upper layers 118*g* and 120*g* each having a thickness t4 thicker than the thickness t3.

The GND electrodes 122" and 124" have the same configurations as the GND electrodes 122 and 124. However, the GND electrodes 122" and 124" are different from the GND electrodes 122 and 124 in that the GND electrodes 122" and 124" have upper layers 122b" and 124b" instead of the upper layers 122b and 124b. Further, the upper layers 122b" and 124b" have the same configurations as the upper layers 122b and 124b. However, the upper layers 122b" and 124b" are different from the upper layers 122b and 124b in that the width (the length in a left-right direction in FIG. 7) of each of the upper layers 122b" and 124b" has the same value (d5) as the width of the upper layer 126b of the GND electrode 126.

Further, a configuration is made such that a distance d4 between each of the upper layers 122b", 124b", and 126b of the GND electrodes 122", 124", and 126 and each of the upper layers 118g and 120g of the signal electrodes 118" and 120" adjacent thereto is larger than a distance d3 from each of the lower layers 118f and 120f of the signal electrodes 118" and 120" adjacent thereto to each of the lower layers 122a, 124a, and 126a of the GND electrodes 122", 124", and 126 (d4>d3).

In this way, in the waveguide optical element 10-3 of this modification example, similar to the waveguide optical element 10, the electric field which is applied to the optical waveguide 108 or the like can be maintained high by adjusting the distance d3 while effectively reducing the electric crosstalk between the signal electrodes 118" and 120" by setting the height (thickness) of each of the GND electrodes 122", 124", and 126 to be a height of 25 μm or more which is several times more larger than in the case of the related art, and deterioration of the operating characteristic of the waveguide optical element 10-3 can be prevented by adjusting the distance d4 to compensate for a change in the high-frequency impedance and a change in the high-frequency propagation speed of the signal line configured of the signal electrodes 118" and, 120" according to an increase in the heights of the GND electrodes 122", 124", and 126.

Further, in particular, the width of each of the upper layers 122b" and 124b" has the same value (d5) as the width of the upper layer 126b of the GND electrode 126, and therefore, the electrode structure around the parallel waveguides 108 and 110 and the electrode structure around the parallel waveguides 112 and 114 respectively become bilaterally symmetrical with respect to a center line C1 between the parallel waveguides 108 and 110 and a center line C2 between the parallel waveguides 112 and 114. For this reason, stress which is generated in the substrate 100 due to providing the signal electrodes 118" and 120" and the GND electrodes 122", 124", and 126 is balanced across the centerlines C1 and C2, respectively, so that the stresses which are applied to the parallel waveguides 108 and 110 become almost equal to each other and the stresses which are applied to the parallel waveguides 112 and 114 become approximately equal to each other. As a result, differences in phase shift amount due to the stress, of two light waves propagating through the parallel waveguides 108 and 110, become approximately the same and differences in phase shift amount due to the stress, of two light waves propagating through the parallel waveguides 112 and 114, becoming approximately the same, and thus it is possible to suppress the temperature fluctuation of a bias voltage when performing a modulation operation, for example.

The lower layers 122a, 124a, and 126a and the upper layers 122b", 124b", and 126b of the GND electrodes 122", 124", and 126, and the lower layers 118f and 120f and the upper layers 118g and 120g of the signal electrodes 118" and 120" may be made of materials different from each other or may be made of the same material.

Further, the thickness t3 of each of the lower layers 118f and 120f of the signal electrodes 118" and 120" may be the same as or may be different from the thickness t1 of each of the lower layers 122a, 124a, and 126a of the GND electrodes 122", 124", and 126. Similarly, the thickness t4 of each of the upper layers 118g and 120g of the signal electrodes 118" and 120" may be the same as or may be different from the thickness t2 of each of the upper layers 122b", 124b", and 126b of the GND electrodes 122", 124", and 126.

For example, if t1 is set to be equal to t3, t2 is set to be equal to t4, the lower layers 122a, 124a, and 126a of the GND electrodes 122", 124", and 126 and the lower layers 118f and 120f of the signal electrodes 118" and 120" are configured of the same material A, and the upper layers 122b", 124b", and 126b of the GND electrodes 122", 124", and 126 and the upper layers 118g and 120g of the signal electrodes 118" and 120" are configured of the same material B (may be different from the material A), this is convenient from the viewpoint of the manufacturing process. In this case, for example, the lower layers 122a, 124a, and 126a of the GND electrodes 122", 124", and 126 and the lower layers 118f and 120f of the signal electrodes 118" and, 120" can be formed of the same material A and in the same thickness t1=t3 by a single metal film formation process, and subsequently, the upper layers 122b", 124b", and 126b of the GND electrodes 122", 124", and 126 and the upper layers 118g and 120g of the signal electrodes 118" and 120" can be formed of the same material B and in the same thickness t2=t4 by another single metal film formation process.

Fourth Modification Example

Figure 8:
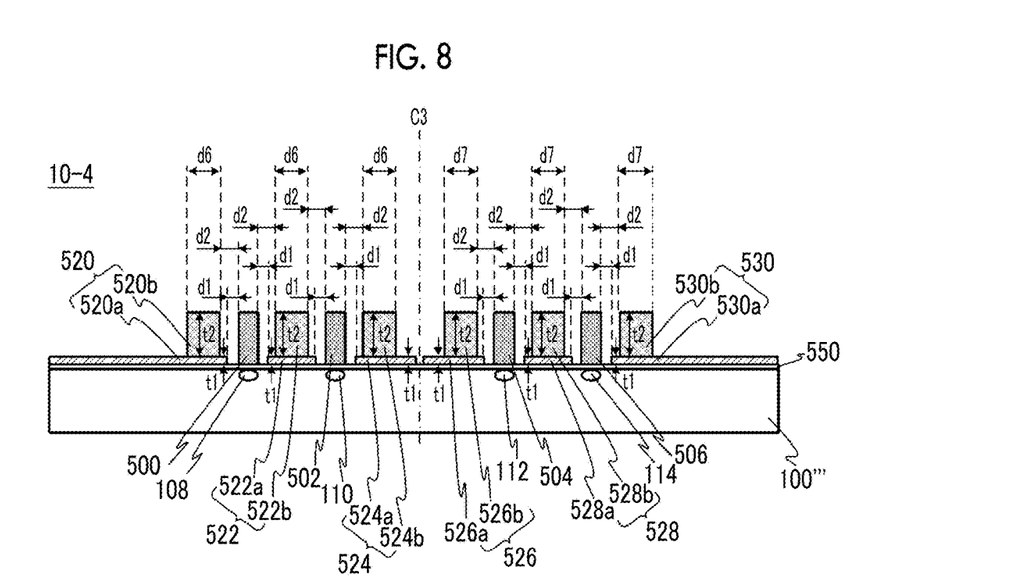
FIG. 8 is a sectional view showing a fourth modification example of the waveguide optical element shown in FIG. 1.

Next, a waveguide optical element 10-4 according to a fourth modification example of the waveguide optical element 10 will be described. FIG. 8 is a sectional view in portions corresponding to the action portions 118a and 120a, of the waveguide optical element 10-4, corresponding to the sectional view taken along line IIA-IIA (FIG. 2A) of the waveguide optical element 10. This modification example has the same configuration as the waveguide optical element 10. However, this modification example is different from the waveguide optical element 10 in that this modification example uses a substrate 100'" which is a Z-cut LN substrate, instead of the substrate 100 which is an X-cut LN substrate. Further, this modification example is different from the waveguide optical element 10 in that this modification example has signal electrodes 500, 502, 504, and 506 formed just above the four optical waveguides 108, 110, 112, and 114 which are parallel waveguides, instead of the signal electrodes 118 and 120. Further, this modification example is different from the waveguide optical element 10 in that this modification example has GND electrodes 520, 522, 524, 526, 528, and 530 formed so as to interpose each of the signal electrodes 500, 502, 504, and 506 therebetween in a substrate surface direction of the substrate 100'", instead of the GND electrodes 122, 124, and 126. Further, a buffer layer 550 made of, for example, $SiO_2$ is formed on the surface of the substrate 100'" so as to cover the optical waveguides 108, 110, 112, and 114.

Further, the GND electrodes 520, 522, 524, 526, 528, and 530 and respectively configured of lower layers 520a, 522a, 524a, 526a, 528a, and 530a each having the thickness t1, and upper layers 520b, 522b, 524b, 526b, 528b, and 530b each having the thickness t2 larger than the thickness t1 and formed on the lower layers 520a, 522a, 524a, 526a, 528a, and 530a, similar to the GND electrodes 122, 124, and 126.

Further, each of the upper layers 520b, 522b, 524b, 526b, 528b, and 530b is configured such that the distance d2 to the signal electrode 500, 502, 504, or 506 adjacent thereto is larger than the distance d1 from the signal electrode 500, 502, 504, or 506 adjacent thereto to each of the lower layers 520a, 522a, 524a, 526a, 528a, and 530a (d2>d1).

In this way, also in the waveguide optical element 10-4 of this modification example, similar to the waveguide optical element 10, the electric field which is applied to the optical waveguide 108 or the like can be maintained high by adjusting the distances d1 and d2 while effectively reducing the electric crosstalk between the signal electrodes 500, 502, 504, and 506 by setting the height of each of the GND electrodes 520, 522, 524, 526, 528, and 530 to be 25 µm or more, and the operating characteristic of the waveguide optical element 10-4 can be favorably maintained by compensating for a change in the high-frequency impedance and a change in the signal propagation speed of the signal lines which are configured by the signal electrodes 500, 502, 504, and 506.

Further, in this modification example, the widths of the GND electrodes 520, 522, and 524 have the same value, d6, and the widths of the GND electrodes 526, 528, and 530 have the same value, d7. In this way, in this modification example, similar to the second modification example, it is possible to suppress the temperature fluctuation of the bias voltage at the time of a modulation operation by balancing the stress on the parallel waveguides 108 and 110 and the stress on the parallel waveguides 112 and 114. If d6 is set to be equal to d7, the stress which is applied to the entire substrate 100''' is also balanced across a center line C3 between two MZ waveguides which are configured by the parallel waveguides 108 and 110 and the parallel waveguides 112 and 114, and therefore, it is possible to further reduce the temperature fluctuation of the modulation operation.

As described above, in the waveguide optical element 10 of this embodiment, the GND electrodes 122, 124, and 126 interposing each of the signal electrodes 118 and 120 therebetween are formed in a thickness of 25 µm or more which is several times thicker than that in the related art, and the GND electrodes 122, 124, and 126 are respectively formed by the lower layers 122a, 124a, and 126a and the upper layers 122b, 124b, and 126b thicker than the lower layers. Further, each of the upper layers 122b, 124b, and 126b is configured such that the distance d2 to the signal electrode 118 or 120 adjacent thereto is larger than the distance d1 from each of the signal electrode 118 and 120 adjacent thereto to each of the lower layer 122a, 124a, and 126a (d2>d1).

For this reason, in the waveguide optical element 10, the electric field which is applied to the optical waveguide 108 or the like is maintained at a desired intensity by adjusting the distance d1 while effectively reducing the electric crosstalk between the signal electrodes 118 and 120 by making the GND electrodes 122, 124, and 126 thick to 25 µm or more, and the high-frequency impedance and the signal propagation speed of the signal lines which are configured by the signal electrodes 118 and 120 and the GND electrodes 122, 124, and 126 are maintained at desired values by adjusting the distance d2, whereby it is possible to favorably maintain the operating characteristic of the waveguide optical element.

The thickness of each of the substrates 100 and 100''' which are the LN substrates can be set to a thickness less than 30 µm. In this case, it is possible to obtain an electrode structure in which electrode impedance is made close to the impedance (generally, 50Ω) of a signal source, compared to a case where the substrate is thick.

What is claimed is:

1. A waveguide optical element which comprises a plurality of optical waveguides provided in parallel on a substrate having an electro-optic effect, the waveguide optical element comprising:
    a plurality of signal electrodes provided in parallel and controlling light waves propagating through each of the optical waveguides; and
    a plurality of ground electrodes provided so as to interpose each of the signal electrodes therebetween in a surface direction of the substrate,
    wherein at least one of the ground electrodes comprises a first layer and a second layer formed on the first layer,
    the second layer is formed such that a distance between the second layer and the signal electrode adjacent to the second layer is larger than a distance between the first layer and said signal electrode adjacent to said second layer, and
    a thickness of the ground electrode which comprises the first layer and the second layer is 25 µm or more.

2. The waveguide optical element according to claim 1, wherein a thickness of the signal electrode is the same as a thickness of the second layer of the ground electrode.

3. The waveguide optical element according to claim 1, wherein the signal electrode comprises a third layer formed on the substrate, and a fourth layer formed on the third layer, and
    the second layer is formed such that a distance between the second layer and the fourth layer of the signal electrode adjacent to the second layer is larger than a distance between the first layer and the third layer of said signal electrode adjacent to said second layer.

4. The waveguide optical element according to claim 3, wherein thicknesses of the third layer and the fourth layer are the same as thicknesses of the first layer and the second layer, respectively.

5. The waveguide optical element according to claim 1, wherein the first layer and the second layer comprise materials different from each other.

6. The waveguide optical element according to claim 3, wherein the first layer and the third layer comprise the same material, and
    the second layer and the fourth layer comprise the same material.

7. The waveguide optical element according to claim 1, wherein the substrate comprises $LiNbO_3$ and has a thickness of less than 30 µm.

* * * * *